May 5, 1953 B. H. McLEOD 2,637,244
APPARATUS FOR MICROSCOPIC ANALYSIS
Filed Oct. 29, 1947 3 Sheets-Sheet 1
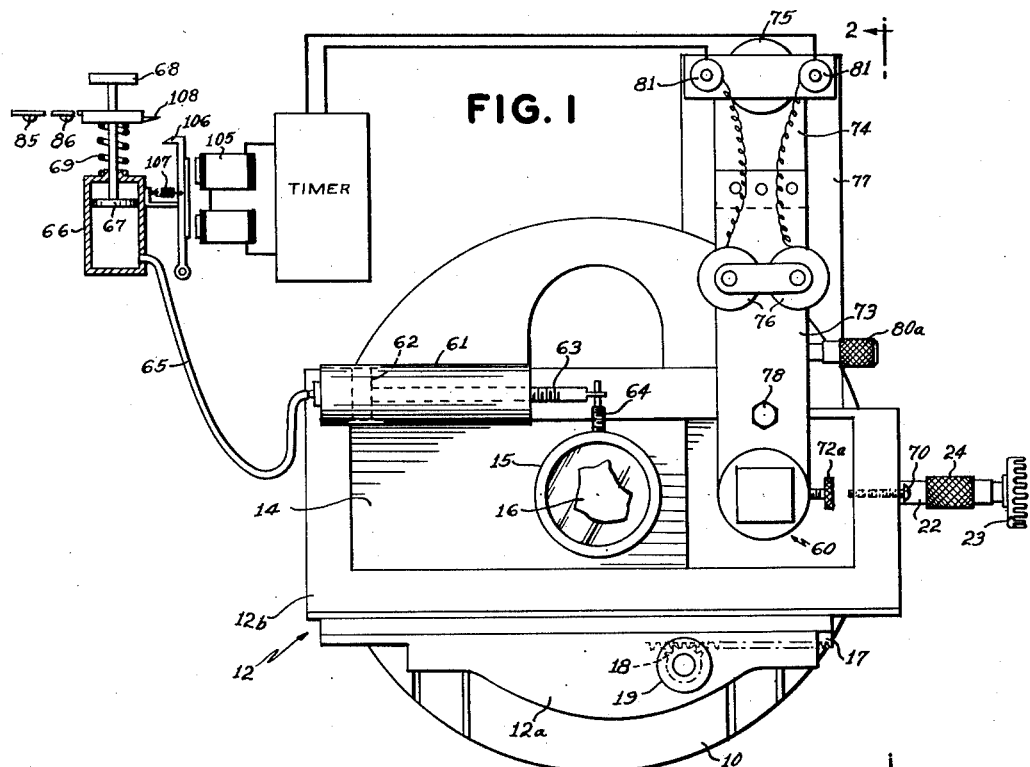
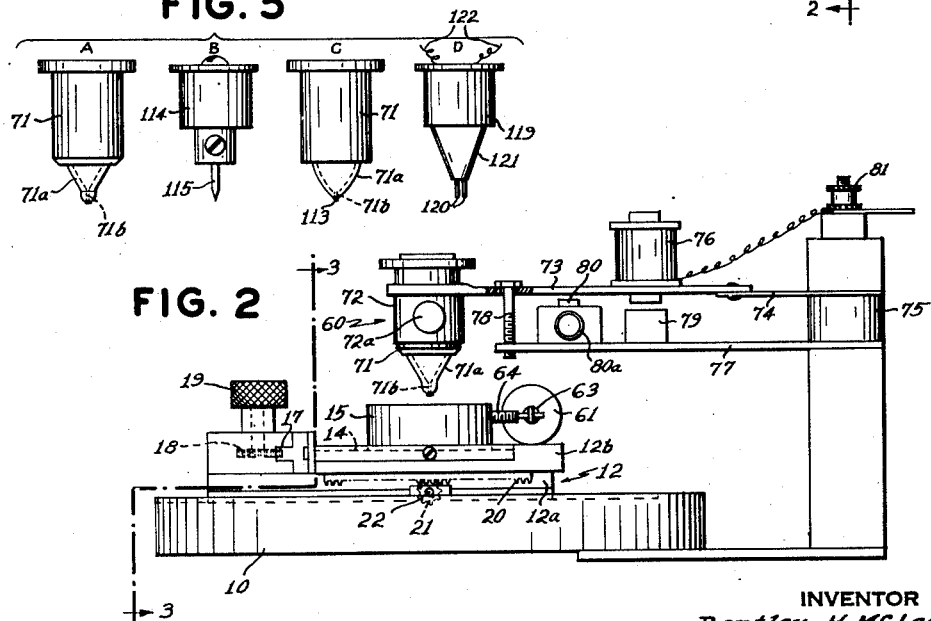
INVENTOR
Bentley H. McLeod
BY
Pennie, Edmonds, Morton and Barrows
ATTORNEYS May 5, 1953　　　　　B. H. McLEOD　　　　　2,637,244
APPARATUS FOR MICROSCOPIC ANALYSIS
Filed Oct. 29, 1947　　　　　　　　　　　　　3 Sheets-Sheet 2

INVENTOR
Bentley H. McLeod
BY
Pennie, Edmonds, Morton and Barrows
ATTORNEYS

May 5, 1953          B. H. McLEOD          2,637,244
APPARATUS FOR MICROSCOPIC ANALYSIS
Filed Oct. 29, 1947          3 Sheets-Sheet 3

INVENTOR
Bentley H. McLeod
BY
Pennie, Edmond, Morton and Barrows
ATTORNEYS

Patented May 5, 1953

2,637,244

UNITED STATES PATENT OFFICE 2,637,244

APPARATUS FOR MICROSCOPIC ANALYSIS

Bentley H. McLeod, Malvern, Ark.

Application October 29, 1947, Serial No. 782,769

11 Claims. (Cl. 88—39)

This invention relates to microscopic analysis of minerals and other materials, and is particularly directed to the provision of improved apparatus for making such analyses. The new apparatus in its complete and preferred form provides for making quantitative analyses of minerals and like materials composed of two or more chemically or crystallographically different constituents intimately intermixed, and for identifying unrecognized constituents in the course of making such quantitative analyses. Thus what in some cases amounts to making both quantitative and qualitative (identifying) analyses of complex minerals may be accomplished concurrently. The apparatus is designed so that such analyses can be made very rapidly—in many cases much more rapidly than is possible by conventional methods and apparatus.

In its complete and preferred form, the new apparatus is built around a microscope having a slide movable in a straight line path across the field of view of the microscope and adapted to hold a mineral specimen to be analyzed. The invention provides, in such apparatus, the combination of a plurality of counters each arranged to record the linear travel of the slide corresponding to the sum of the lengths, along a line parallel to the line of motion of the slide, of the particles of a given recognized constituent of the specimen, as the slide with specimen thereon is moved across the microscope field of view, with means for momentarily interrupting movement of the slide along said straight line path, and a reagent applicator for applying a reagent to any unrecognized constituent particle of the specimen when said movement of the slide is interrupted, thereby to enable identification of such unrecognized particles and to enable them to be properly included in the counter record. More particularly, the invention provides improved analytical apparatus for use in connection with a microscope having a stage, a slide holder mounted on the stage and movable in a straight line path across the microscope field of view, a slide mounted on the slide holder and adapted to hold a mineral specimen to be analyzed, and a micrometer feed arranged to move the slide holder and slide with specimen thereon across the microscope field of view. In accordance with the invention a plurality of counters are provided, each of which may be individually connected to the micrometer feed, for recording the distance of travel of the specimen on the slide corresponding to the sum of the lengths of the particles of each recognized constituent of the specimen, said lengths being measured between intercepts of the boundaries of each particle with a point of observation in the microscope field of view, as the micrometer feed drives the slide holder and slide linearly across said point of observation. To identify unrecognized constituent particles of the specimen coming into position for observation, a reagent applicator is provided, and the slide is made movable on the slide holder (preferably at right angles to the line of motion of the slide holder) to bring a given point on the specimen from directly beneath the microscope objective to directly beneath the reagent applicator, and back again. It is desirable also to provide timer means for actuating delivery of the reagent to the specimen for a predetermined length of time, and for actuating return of the slide to bring the reagent-treated point of the specimen back under the microscope objective within a predetermined time interval after the first contact of the reagent with the specimen.

To provide a better understanding of the invention, a preferred embodiment of the new apparatus is described in detail in Section II of this specification; but before doing so, in order to facilitate understanding the new apparatus and its mode of operation, the nature of the analyical operations which may be performed with the aid of the new apparatus are described in the following Section I.

SECTION I

(a) Linear measurement method of analysis

Most minerals and other materials are composed of intimately mixed grains or particles of chemically, crystallographically, or otherwise different materials. If the identity of each of the particles is recognized, and if distribution of the particles is statistically uniform, a quantitative analysis of the material can be made by purely physical (microscopic) methods. The three methods so far developed for doing so involve (a) determining the number and sizes of grains of each particle, (b) determining the total surface area of the grains of each recognized constituent as they appear on a polished specimen, and (c) measuring, on a polished sample, the sum of the distances between intercepts of the boundaries of the grains of each recognized constituent with a line along the surface of the sample (i. e. measuring the sum of the lengths of such grains along said line). Methods (a) and (b), if properly carried out, give accurate results, but require much preparation of the sample and considerable time for the analysis itself. Method (c) is also capable of a high degree of accuracy in appropriate cases, and generally can be carried out more expeditiously than the other methods. Moreover, it lends itself readily to use in conjunction with specially designed apparatus, and is accordingly the method which is used with the apparatus of the invention.

As used in conjunction with the new apparatus, this linear measurement method of analysis—method (c)—involves preparing a polished specimen and mounting it on the movable slide of a microscope. The specimen is then moved in a straight line path across the microscope field of view. The specimen is seen in the microscope eye-piece to move past a point of observation (defined, say, by cross hairs visible in the microscope), and the distance the slide moves from where the boundary of a given grain first intercepts this point of observation to where the opposite boundary thereof intercepts such points is recorded. From the sum of the distances thus measured and recorded for the grains of each constituent of the specimen, and from the total measured length of the specimen, it is possible to compute the quantities of each constituent present. The apparatus of the invention provides for quickly and accurately measuring, recording and summing the distances determined in carrying out this method of analysis.

It is evident from the foregoing that the linear measurement method (like other physical methods of analysis) requires that the analyst recognize the constitution of each grain of the specimen. Even skilled analysts often cannot identfy with certainty, simply from visual examination, the constitution of every grain in a specimen of a complex mineral. For the most effective and general use of the analytical method of linear measurement, therefore, a rapid and sensitive method for quickly identifying an unrecognized constituent particle of the specimen must be used in connection therewith. The apparatus of the invention provides for making identifying analyses of mineral or other particles, in accordance with the method described below.

(b) Identification analysis of minerals

The identification of opaque minerals has been investigated by many mineralogists and present day methods are chiefly based on original work by Murdock (1916), Davy and Farnham (1920) and many others, the latest compilation of information being by M. N. Short in Geological Survey Bulletin 914 (1940). The methods adopted require that a drop of reagent either from a pipette or a platinum loop be placed upon the polished surface of the mineral to be identified, and then that the reaction or the results of the reaction be examined under the microscope. Therefrom it is possible to identify the mineral particle.

Some workers recommend that the reactions should not be made under the microscope for fear of damaging the lens; others that it is easier to place the drop of reagent on the mineral to be identified if it is done while watching the operation through the microscope. In the first case, if the slide is moved out from under the lens, it is obvious that a small grain cannot again be quickly found. In the second case, high magnifications, which are needed to see small grains, cannot be used because there is insufficient clearance between the lens and the object to put a drop of solution or acid on the object without also putting it on the lens. Added to these difficulties, when examining a polished briquette of concentrates, for example, there may be hundreds of mineral particles covered by the drop of solution. Solution drops smaller than 1 millimeter (1000 microns) cannot easily be used, because they evaporate too fast and so change the concentration of the reagent, or, in the case of acids, evaporate before the reaction takes place. Also, in a collection of minerals such as a metallurgical concentrate, some mineral might be soluble in the reagent and the resulting solution could have a different action on the particle that was being examined than would the original reagent.

The reagents used in the method I have developed are not liquids. Vapors are used instead and so there is no possibility of damage to the costly high-power objective lenses that can be used with this method. Whereas 100 diameters (10-power objective and 10-power eye-piece) is the maximum magnification that can be used conveniently with liquid reagents, 600 diameters (60-power objective and 10-power eye-piece) can be used with the vapors. The use of vapors for filming or staining minerals is not new; the identification of some minerals is based on the fact that the vapors from a drop of nitric or hydrochloric acid will stain. However, I believe that the deliberate application of vapors to a mineral surface, as I have developed it, is entirely new and that results can be obtained by this method that cannot be obtained in any other way. Furthermore, the placing of drops of liquid reagent even 1 mm. (1000 microns) in diameter exactly at the right place required considerably skill, patience and time. With my new apparatus, a spot of reagent 10 microns in diameter, applied in vapor form, can be placed with an accuracy of two or three microns on any part of a mineral grain that is desired. All reactions are dry and so there is no interference from different minerals. An average length of time of making a test may be 10 seconds, but very many tests will take no longer than 2 seconds. This is definitely an advantage over the manual application of the drops of liquid reagent.

In view of the foregoing novelties of the mineral analysis method which my new apparatus is designed to employ, it is worthwhile to describe in some detail the nature of this method, in order that the capabilities of the new analytical apparatus may be fully understood and appreciated.

The reagents most commonly used are the three halogens, iodine, chlorine, and bromine. Mixtures of the three halogents are also used. Nitric and hydrochloric acids are used occasionally. The strength of the vapors can be varied as desired, either by varying the reagents in the holders from which they are applied or by keeping the ends of the holders from contact with the mineral surface, in which case the vapors are diluted by air. If the vapors are too weak, differential staining of different crystals may occur which property is sometimes used advantageously. For example, the time required to stain Butte (Montana) primary isometric chalcocite and the time required to stain Inspiration (Arizona) secondary orthorhombic chalcocite is the same when using standard iodine. When very dilute bromine is used the Inspiration chalcocite is stained differentially, bringing out the crystal structure. Therefore, when timing the effect of a reagent, it should be strong enough to prevent differential staining if possible.

For the iodine reagent, solid iodine is used One filling of a holder with this reagent is good for many months.

Weak chlorine is supplied by calcium hypochlorite, which slowly decomposes, liberating chlorine. A holder of this reagent retains its strength for weeks. For stronger chlorine, the gas is dissolved in carbon tetrachloride, a saturated solution of which is too strong but can be diluted as desired. The life of this strong reagent at a constant strength is only a few hours.

Bromine is absorbed by hydrated lime, which, very slowly, gives it up again; the reagent is good for a week. Stronger bromine is obtained by using bromine water or bromine dissolved in carbon tetrachloride, in which it is infinitely soluble. Undiluted bromine will instantaneously burn a hole in almost any sulfide mineral (except a few such as pyrite galena and molybdenite) and is too strong for use. Strong bromine solutions remain at constant strength for only a few hours.

Iodine and calcium hypochlorite may be used ground up together, and bromine with hydrated lime may be mixed with calcium hydrochlorite. The iodine mixture is good for weeks and the bromine mixture remains constant for about 48 hours.

There are two general results obtained from the application of the reagents to the minerals. In the first case a hard dry film is produced on the polished surface of the mineral. In the second case the "film" is composed of minute droplets or hemispheres of liquid, similar to the mist produced when breathing on a mirror. This effect is termed a "condensate." Frequently this condensate is deposited more on one crystal than on another, or the hemispheres will be differently spaced and of different sizes on one mineral than on another and give rise to recognizable reactions. When breathed upon (the specimen need not be moved from under the objective), these droplets coalesce and bring about secondary reactions which often result in a specific test for that mineral. The condensate may have a color due to the color of the mineral, to the color of the dry film put on the mineral by the reaction, or to the color of the liquid itself. These condensates are the product of a dry gas and a solid, the moisture being taken from the atmosphere on account of the hygroscopic nature of the salts produced. The size of the condensate droplets depends upon the intensity of the hygroscopic property of the salt itself. In the case of enargite with bromine-chlorine the condensate cannot be resolved even at a magnification of 500 diameters, whereas the condensate produced with stibnite and chlorine sometimes consists of a single drop.

In many instances, for example the bismuthinite test with bromine, flat irregular shaped films of liquid are produced that are so thin that they show the iridescent colors of thin films. This type of deposit is termed "scales."

The following examples of test reactions on six different minerals indicate some of the different types of reactions that may occur:

Tetrahedrite with a mixture of bromine and chlorine gives, in 3 to 5 seconds, iridescent scales with a network of fine needles on the periphery. Tennantite in 3 seconds gives a green condensate.

Enargite with bromine-chlorine mixture gives, in 3 seconds, a purple color that fades to brown, in 4 seconds a blue that fades to purple, and in 5 seconds a light blue that fades to dark purple. When blown upon, the extremely small droplets that give these colors coalesce and the colors instantly disappear.

Bismuthinite with bromine gives, in ½ second, light brown scales, in 2 seconds light blue scales, in 4 seconds magenta scales. In a minute or so after removal of the reagent these scales will collect together to make a few long needle-like crystals that will grow right across the reagent spot.

Stibnite with iodine gives a mauve color in from 5 to 60 seconds; the color does not change during the reaction time but gets more intense.

Niccolite with iodine gives, in 15 seconds, dendrites in the center of the drop and a brown condensate halo. In 60 seconds the center will be full of iridescent crystals with a gray to brown differential condensate halo.

Proustite with iodine mixed with chlorine gives, in 2 seconds, a purple brown that gets darker and darker and then becomes sprinkled with minute black needle crystals.

In the table below are tabulated the reactions of some of the commoner minerals with several different reagents. The iodine reagent used was of standard strength, the bromine reagent was bromine absorbed by lime, the weak chlorine came from calcium hypochlorite, and the strong chlorine came from chlorine dissolved in carbon tetrachloride. The two chlorine strengths show the extreme differences in the reactions produced by different concentrations of the same reagent.

TABLE

| Mineral | Time Sec. Iodine | Time Sec. Bromine | Time Sec. Weak Chlorine | Time Sec. Strong Chlorine |
|---|---|---|---|---|
| Chalcocite | 1.5 Purple | 0.3 Purple | 2.1 Purple | Inst. Iridescent. |
| Chalcopyrite | Negative | 0.25 Brown Cond. | Negative | 0.25 Blue Cond. |
| Tennantite | ----do---- | 3 Dark olive green Cond. Brown Halo. | 30 Faint brown | 0.1 Blue Cond. |
| Tetrahedrite | ----do---- | 3 Black brown Cond | Negative | Inst. Blue Black. |
| Enargite | ----do---- | Structure revealed | ----do---- | 0.7 Purple. |
| Pyrite | ----do---- | Negative | ----do---- | Negative. |
| Pyrrhotite | ----do---- | 5 Reddish Cond | ----do---- | 0.5 Yellow Cond. large drops. |
| Niccolite | 15 Dendrites Brown Cond. Halo. 60 Irid. Crystals Gray Cond. Halo. | Cond. Colorless Drop | ----do---- | 2 Differential Cond. |
| Siegenite | Negative | Negative | ----do---- | Shows up scratches. |
| Millerite | ----do---- | 0.5 Diff. Gray brown Cond | ----do---- | 0.5 Gray Cond. |
| Argentite | 1.25 Purple | Negative | ----do---- | Negative. |
| Proustite | 60 Purple | ----do---- | ----do---- | Diff. Stain Fades out. |
| Pyrargyrite | 45 Purple | 1 Purple fades to brown. 3 Light blue fades to purple. | ----do---- | Inst. Iridescent. |
| Poylbasite | 3.5 Purple | Negative | ----do---- | 0.8 Purple. |
| Sphalerite | Negative | 1 Black Cond | 0.5 Brown Cond | Inst. Cond. |
| Galena | ----do---- | Negative | Negative | Negative. |
| Bismuthinite | ----do---- | 1.7 Purple | ----do---- | 1 Colorless Cond. Dries stains yellow. |
| Stibnite | 10 Mauve | 1 Black Cond. fades through iridescent scales to nothing. | ----do---- | 0.5 Large Colorless Drop iridescent ring. |

A factor often of considerable importance is the timing of the contact between the reagent and the mineral. The following description of the effect of iodine vapor on chalcocite illustrates this point. The reagent produces a round colored spot on the mineral, the coloring first being apparent near the center of the spot and then pushing out to the edge. The colors produced are caused by a film of a reaction product one half the wave length of that color of light in thickness, and modified by the color of the product itself. The different colors that are produced after different times of contact are as follows:

| Contact time in seconds | Color produced by filming |
|---|---|
| .25 | Barely perceptible change in color of the white chalcocite. |
| .50 | Faint brown. |
| 1.0 | Brown. |
| 1.5 | Brown with purple shading. |
| 2 | Purple with brown edge. |
| 3 | Light blue with purple and brown edge. |
| 4 | Light yellow, light blue, purple, brown. |
| 5 | Orange, yellow, light blue, brown. |
| 6 | Magenta, orange, etc. |
| 7 | Purple, magenta, orange, etc. |
| 8 | Green, blue green, magenta, etc. |
| 9 | Yellow green, green, blue magenta, etc. |
| 11 | Pink, green, blue, etc. |
| 14 | Green, pink, green, blue, etc. |

This is the series of colored spots produced by iodine on a piece of chalcocite—on any piece of chalcocite. Consequently the color produced in a given time enables identification of the mineral. Usually the first sign of purple is the color used to identify chalcocite. It may be that some other mineral will show the same purple in the same time (none has ever been found yet) but if it does it is almost certain that it will not show the same color as the other mineral in some other length of time. The mineral that gives the purple in the time closest to that of chalcocite is argentite. It will give the purple in 1.25 seconds (with chalcocite it was 1.5 seconds), but it never gives the orange or magenta—instead it passes into a gray at 7 seconds and from then on there is no change.

Other effects can be demonstrated. For example, no length of contact of iodine with chalcopyrite will produce a stain, but if the chalcopyrite contains silver in solid solution it can be stained in a few seconds. Conversely, chalcocite can be filmed by chlorine almost instantaneously, but if silver is present in solid solution, it will show no color after any length of time of contact.

Many other distinctive effects could be mentioned, but the foregoing are illustrative. As in other methods of mineral determination, there are some minerals that are negative to any reagents thus far employed.

SECTION II

Apparatus

A particularly advantageous embodiment of the new apparatus by which minerals and other materials may be analyzed using the methods described in Section I hereof is shown in the accompanying drawings, wherein:

Fig. 1 is a plan view of the new apparatus as it may be mounted on the stage of a microscope for carrying out analyses of minerals;

Fig. 2 is an elevation taken substantially along the line 2—2 of Fig. 1;

Fig. 5 shows various types of reagent holders and test devices;

Figure 3:
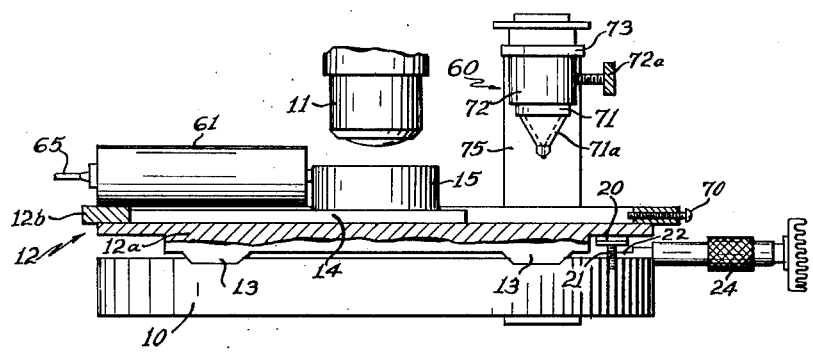
Fig. 3 is a view, partly in section, taken substantially along the line 3—3 of Fig. 2.

Referring particularly to Figs. 1 to 3, the apparatus of the invention is assembled on a microscope stage or platform 10 positioned beneath the microscope objective 11. The new apparatus comprises a slide holder 12 movable back and forth in a straight line path on ways 13. A slide 14, slideable in a recess formed in the slide holder in a direction at right angles to the line of motion of the slide motion of the slide holder on the ways 13, is provided with a specimen holder 15 in which a specimen 16 to be examined may be mounted.

The slide holder 12 preferably comprises two parts, a lower member 12a on which the ways 13 are provided, and an upper rectangular frame 12b slideably mounted thereon for movement in a direction at right angles to the direction of movement on the ways 13. The slide holder frame 12b is provided with a rack 17 engaging a pinion 18 rotatably mounted on the slide holder lower part 12a. A knob 19 is provided for manually turning the pinion 18. By manipulation of the knob, the specimen 16 may be moved back and forth under the objective microscope in a line perpendicular to motion of the slide holder on the ways 13.

Motion of the slide parallel to the ways 13 is effected by means of a second rack 20, on the lower part 12b of the slide holder, engaging a pinion 21 on a shaft 22 journaled in bearings mounted on the microscope stage 10. The shaft 22 terminates in a coupling element 23 for connection with a motor drive, and includes a knurled collar 24, to facilitate turning the shaft by hand when desired. Rotation of the shaft 22 and the pinion 21 connected thereto moves the slide holder 12 with the slide 14 and specimen holder 15 carried thereby in a line of motion parallel to the ways 13. Thus, by combining manipulations of the shaft 22 and the knob 19, any desired point on the specimen 16 may be brought into position for observation through the microscope.

Figure 6:
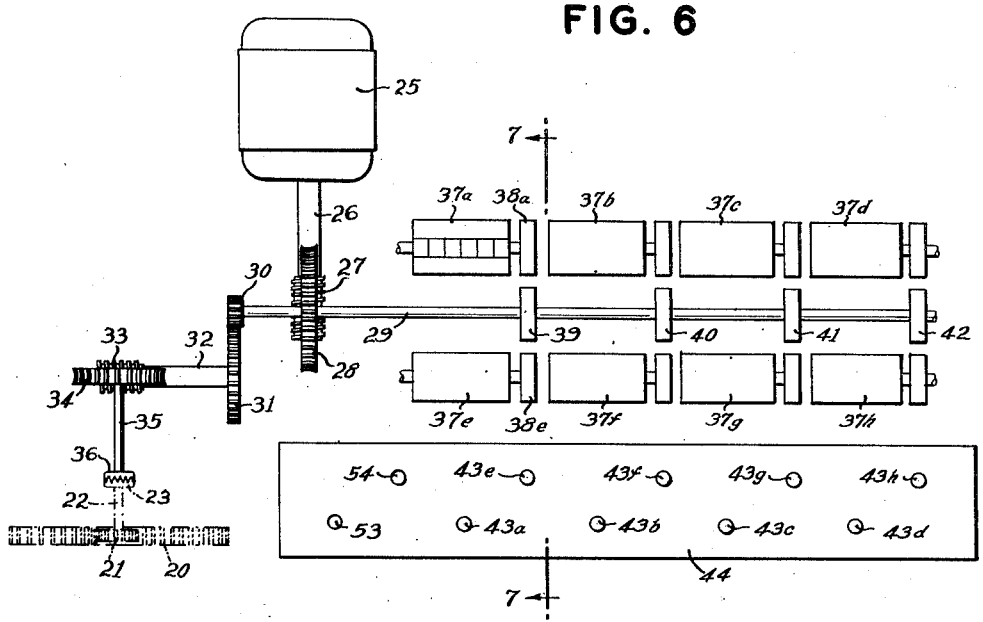
Fig. 6 is a plan view of the array of counters and the gear train through which the micrometer feed is driven.

The motor drive through which the shaft 22 may be rotated is shown in Fig. 6. This motor drive is employed for making analyses by the linear measurement method described above in Section I. The drive comprises an electric motor 25, preferably one that can be operated at various controlled speeds, having a motor shaft 26 on which a worm 27 is mounted. The worm engages a worm gear 28 on a counter clutch shaft 29. A small gear 30 on the end of this shaft drives a larger gear 31 on a shaft 32 which carries a second worm 33. This second worm drives a second worm gear 34 on a shaft 35 which is provided with a coupling element 36 for mating with the coupling element 23 on the shaft 22. Through the gear train just described, the shaft 22 may be turned at a very much slower rate of speed than the motor 25, and thereby the slide holder may be moved slowly and steadily along the ways 13, causing the specimen slowly to pass beneath the microscope objective.

Because of the high gear ratio between the shaft 22 and the counter clutch shaft 29, a single rotation of the counter clutch shaft corresponds to a very small distance of linear travel of the slide holder. Such a high gear ratio drive for the slide holder is herein termed a "micrometer drive," or "micrometer feed." It is generally desirable, for ease in carrying out the linear measurement method of analysis, to make the gear ratio between these two shafts such that a single revolution of the clutch shaft 29 corresponds to linear movement of the slide through some such convenient distance as an even 100 microns.

The micrometer feed may be engaged with, or separated from, the shaft 22 on the slide holder, as desired, by virtue of the provision of the separable coupling elements 23 and 36.

A plurality of counters 37a, 37e, etc., are arranged in two rows along the counter clutch shaft 22. These counters may be of the conventional decimal counting type which, when connected to the counter clutch shaft 29, record the number of revolutions thereof, and advantageously read directly to the nearest $\frac{1}{10}$ revolution of the shaft 29. With counters of this sort, and a micrometer feed gear ratio providing one revolution of the counter clutch shaft for each 100 microns of travel of the slide, each digit of the counter record corresponds to 10 microns of slide holder travel. Each counter is driven through a counter friction drive wheel 38a, 38e, etc.; and each counter is mounted so that its drive wheel is in juxtaposition with a friction clutch wheel 39, 40, 41 or 42 on the counter clutch shaft 29. The counter drive wheels 38 do not directly engage any of the clutch wheels on the shaft 29, and are not normally connected thereto. Any one counter may, however, be connected to the counter clutch shaft 29 by depressing the appropriate one of a series of control buttons 43a, 43e, etc., on a control panel 44.

Figure 7:
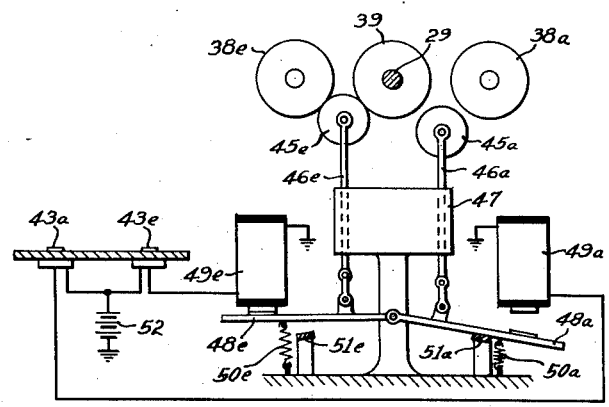
Fig. 7 is a view, somewhat schematic, taken substantialy along the line 7—7 of Fig. 6.

Referring to Fig. 7, which shows the electromechanical arrangement by which this connection is effected, a plurality of friction clutch wheels 45a, 45e, etc., are arranged one between and below each counter drive wheel 38a, 38e, etc., and the nearby clutch wheel 39, etc., on the counter clutch shaft 29. The clutch wheels 45a, 45e, etc., are freely rotatable on supporting rods 46a, 46e, etc., slideable in a guiding frame 47. These rods are connected pivotally at their lower ends to pivotally mounted armatures 48a, 48e, etc., of solenoids 49a, 49e, etc. Springs 50a, 50e, etc., normally hold the armatures down against stops 51a, 51e, etc., thereby holding the clutch wheels out of contact with the mating clutch wheels 39, etc., on the shaft 29 and out of engagement with counter drive wheels 38a, 38e, etc. In Fig. 7, one clutch wheel 45a is thus shown in its lowered position out of contact with the adjoining friction wheels 38a and 39. With the clutch wheel 45a in the position shown, the counter 38a with which it is arranged to be connected is, of course, not driven.

If one of the control buttons 43a, 43e, etc., (which are ordinary push button switches), is depressed, an electrical circuit is completed through a battery 52 and one of the solenoids 49a, 49e, etc. (each of these control buttons is connected with but one of the solenoids). The solenoid that is thus energized lifts its armature 48a, 48e, etc., against the force of the spring 50a, 50e, etc., connected thereto, and thereby elevates the corresponding clutch wheel 45a, 45e, etc., into frictional driving engagement with the corresponding counter drive wheel 38a, 38e, etc. and clutch wheel 39, etc., adjacent thereto. Thereby the counter is connected to the counter clutch shaft and rotates with it. In Fig. 7, the armature 48e and clutch wheel 45e are shown in the position assumed when the control button 43e is thus depressed to energize the solenoid 49e, and in which position the counter 37e is connected to and driven by the clutch shaft 29.

The control panel 44 carries two additional control push button switches 53 and 54, the first of which is provided to stop the motor 25 whenever it is depressed, and the second of which is provided to accelerate the motor whenever desired. The stop button 53 may be used to stop the motor drive when, for example, it is desired to examine closely a point on the specimen being observed through the microscope— for example, to identify a grain in the specimen that is not immediately recognized. The accelerator button 54 is depressed whenever it is desired to speed up the motor drive, as when a large grain comes into the microscope field of view, and it is desired to move the specimen rapidly along.

Figure 8:
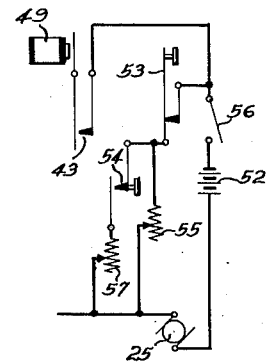
Fig. 8 is a wiring diagram for the apparatus shown in Figs. 6 and 7.

An electrical circuit found satisfactory for incorporating these controls when using a small battery-operated motor 25 for the micrometer drive is shown in Fig. 8. The motor is connected to the battery 52 through a variable resistance 55, the normally-closed stop control switch 53 and a snap switch 56 by which the motor is turned on or off for use. Whenever the control switch 53 is depressed, then even with the snap switch 56 closed the circuit through the motor is broken and it stops. A second variable resistance 57 and the normally-open accelerator control switch 54 are connected in series with each other and in parallel with the first variable resistance 55. Whenever the switch 54 is depressed, the second resistance 57 is connected in parallel with the first resistance 55, thereby reducing the series resistance in circuit with the motor and battery. The motor thereupon speeds up. The resistances 55 and 57 are made variable so that the normal speed and the accelerated speed of the motor 25 may be preset at desired values for the type of specimen being examined. The wiring diagram of Fig. 8 also shows the simple series connections between any one of the control push button switches 43, the one of the solenoids 49 connected therewith, and the battery 52.

In using the apparatus thus far described, a mineral or other specimen to be examined is mounted in the specimen holder 15, and the knob 19 is manipulated to bring the specimen into desired position for examination. The motor driven micrometer feed is then started to move the specimen across the microscope field of view. Upon looking through the microscope, the specimen will be seen to move steadily past a point of observation such as may be defined by crosshairs. When the approaching boundary of the first particle of a recognized constituent is directly under this point of observation, one of the control buttons (say 43a) is depressed, thereby connecting the associated counter (37a in this case) with the counter drive shaft. The button 43a is held depressed until the opposite boundary of the particle comes directly under the point of observation. The control button is thereupon released, thus disconnecting the counter 37a. Knowing the gear ratio between the counter clutch shaft 29 and the shaft 22 and the travel of the slide holder corresponding to one revolution of the shaft 22, and knowing the difference between the initial and final readings of the counter, it is a simple matter to compute the length of the particle observed along the line of motion of the slide holder through the point of observation in the microscope field of view. The same sequence of operations is repeated as each different recognized particle of the specimen comes under the microscope crosshairs (or other point of reference), except, of course, that a different control button, through which a different counter is operated, is depressed for each different recognized constituent of the mineral. When the entire specimen has passed under the microscope, the counters contain a record of the distance the slide holder has traveled corresponding to the sum of the lengths, along the line of motion of the slide holder, of the particles of each recognized constituent of the specimen. From these data a quantitative analysis of the specimen may be computed.

It often happens that some of the grains or particles of the specimen are very small and some are very large. Normally it is desirable for the slide holder to advance slowly while observing the small grains, but when a large particle comes into the field of view, it is desirable to speed up the motion of the slide holder to save the analyst's time. This is accomplished by depressing the accelerator button 54.

It will hometimes happen, too, that an unrecognized constituent particle will come into the field of view. When this happens, the stop button may be depressed, to stop the motion of the slide holder and examine the unrecognized particle more closely. If it cannot be identified from careful visual examination alone, then the apparatus of the invention may be used to identify it by chemical or other means, using the methods described above in Section I. The apparatus used for this purpose comprises primarily a reagent applicator 60, means for moving the speciment 16 from under the microscope objective into position under the reagent applicator and back again, and a timer control for timing the application of the reagent, and is shown particularly in Figs. 1 to 4.

Referring first to Figs. 1 to 3, the means for moving the specimen from under the microscope objective 11 to under the reagent applicator 60 comprises an air cylinder 61 mounted on the upper frame 12b of the slide holder. A piston 62 within the air cylinder is connected by a piston rod 63 to a pin 64 projecting laterally from the specimen holder 15. The air cylinder is connected by a flexible tube 65 to an air compressor 66 in the form of a cylinder having therein a piston 67 which may be pushed down by a plunger 68. The plunger is normally held in the raised position by a spring 69, but when it is depressed, the air beneath the piston 67 is compressed and forced through the tube 65 into the air cylinder 61. Thereupon the slide 14, with specimen 16, is moved (to the right in Figs. 1 and 3) to bring the specimen into position directly beneath the reagent applicator.

The reagent applicator itself is mounted at a fixed predetermined distance from the microscope objective, and the limit of travel of the slide 14 is made equal to this fixed distance by means of an adjustable stop screw 70. By proper careful setting of the stop screw 70, a point that was originally directly under the microscope crosshairs can be brought into position accurately centered beneath the reagent applicator, and when the slide is returned to its original position, the same point is again brought directly under the microscope crosshairs.

The reagent applicator itself (best shown in Fig. 2) comprises a reagent holder made up of a hollow sleeve or holder 71, having therein a hollow glass liner 71a pointed at its lower end and provided with an extremely fine opening 71b extending from its interior through its pointed lower end. A reagent, as described in Section I above, is placed inside the glass liner. The reagent holder is held (by a set screw 72a) in a bushing 72 mounted at the end of an arm 73. Riveted to the opposite end of the arm is a leaf spring 74 by which the arm is fastened to a supporting post 75. A solenoid 76 also is mounted on the arm. A rigid frame member 77 projects out from the post 75 underneath the arm 73. At its outer end this frame member is threaded to receive a stop screw 78 which passes freely through a hole in the arm 73. The leaf spring 74 urges the arm 73 upwardly, but upward movement of the arm is limited by the position of the stop screw 78. A solenoid armature 79 also is mounted on the member 77 directly beneath the solenoid 76. When the solenoid is energized, it is attracted toward the armature 79, thereby depressing the arm 72 against the force of the leaf spring 74. A stop 80 (which may be raised or lowered by means of a control screw 80a) limits the extent to which the arm 73 may be depressed when the solenoid is energized. Connections to the solenoid are made through binding posts 81.

The position of the reagent applicator is preferably adjusted so that the lower pointed end of the reagent holder is in a horizontal plane just slightly above the surface of the specimen so long as the solenoid 76 is not energized. When, however, the solenoid is energized, the arm 73 is depressed enough to bring the pointed end of the reagent holder firmly against the surface of the specimen.

Figure 4:
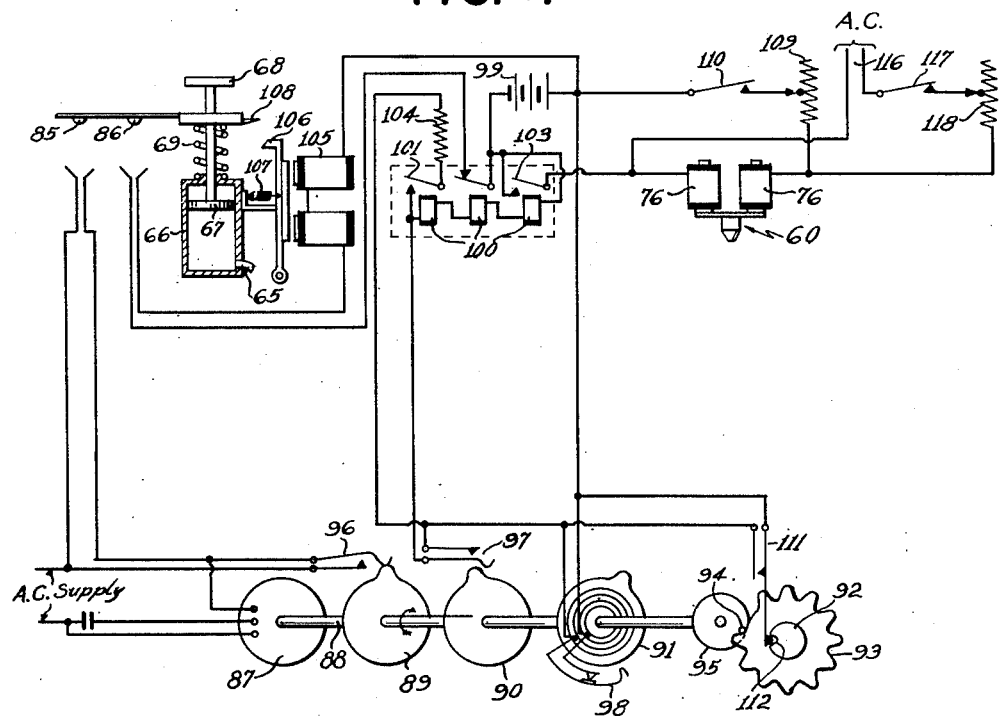
Fig. 4 is a schematic diagram of the timer and associated electrical circuit.

It is evident that a simple electrical circuit with a battery and a switch to energize the solenoid 76 may be provided for manual operation of the reagent applicator. As pointed out in Section I, however, it is frequently desirable to control rather accurately the time of reagent application, and accordingly a control for accomplishing this purpose is shown in Fig. 4. The control is set in operation when the plunger 68 (Figs. 1 and 4) is depressed to force compressed air from the compressor 66 through the flexible tubing 65 to the air cylinder 61, thereby moving the slide 14 carrying the speciment 16 from under the microscope objective to under the reagent applicator. The plunger 68 carries two contact buttons 85 and 86. When the plunger reaches the bottom of its stroke, the first of these buttons 85 completes a circuit (Fig. 4) connecting a small synchronous motor 87 with an alternating current supply line. The motor is geared down and drives a cam shaft 88 at a rather slow speed— say 4 R. P. M. Three cams 89, 90 and 91 are mounted directly on the cam shaft, and a fourth cam 92 mounted on a toothed wheel 93 is driven from the cam shaft by a pin 94 on a hub 95 connected to the cam shaft. The cams are shown in Fig. 4 in the positions they have when the plunger 68 is first depressed, provided the cam shaft rotates clockwise, as indicated by the arrow. In this position, a normally closed spring switch 96 is held open by the first cam 89. This switch is connected in series with the motor 87 and the A. C. supply line, so that as soon as the motor has rotated the cam shaft the few degrees necessary to disengage the first cam 89 from the switch 96, this switch closes and the motor continues thereafter to run regardless of whether or not the plunger is held depressed. It will continue to run until the cam shaft has completed one revolution and the cam 89 again opens the switch, whereupon, if the contact button 85 has meanwhile been raised, the motor will stop.

When the motor has rotated the cam shaft 88 a few degrees further, the second cam 90 closes a normally open spring switch 97. Closure of this switch completes a series circuit through a normally closed spring switch 98 mounted for operation by the third cam 91, a battery 99, and solenoids 100 of a three-gang relay having three contacts 101, 102 and 103. Initially the first and third contacts 101 and 103 of this relay are open and the second contact 102 is closed, as shown in Fig. 4. Upon closure of the cam-actuated spring switch 97, however, the solenoids 100 are energized and reverse these positions of the contacts, closing the first and third contacts 101 and 103 and opening the second contact 102.

The first contact 101 is a holding contact for the relay. When closed, it completes a series circuit through the relay solenoids 100, the battery 99, the normally closed switch 98 actuated by the third cam 91, and a small resistance 104, thereby short-circuiting the switch 97 operated by the second cam 90 and holding the contacts 101, 102 and 103 in the positions assumed when the solenoids 100 are energized, regardless of whether or not the switch 97 continues to remain closed. As a matter of fact, the switch 97 opens very shortly after it has been closed, with continued rotation of the cam shaft 88.

The second contact 102 of the three-gang relay is in a circuit which includes in series the second contact button 86 actuated by the plunger 68, a plunger latch solenoid 105, and the battery 99. This circuit serves to open a latch 106 normally held by a spring 107 in a closed position to engage a catch 108 on the plunger 68. When the plunger is first depressed, the contact button 86 thereon completes the circuit through the solenoid 105, the battery 99 and the second contact 102 of the three-gang relay (which, at the time the plunger is depressed, is closed). Thereupon the solenoid 105 is energized and the latch 106 is magnetically attracted out of position for engagement with the catch 108. So long as the solenoid 105 remains energized, the plunger 68 will be lifted by the spring 69 as soon as the force holding it down is released. If for any reason the motor 87 does not operates when the plunger is depressed (say because it is disconnected at a main current supply switch), and in consequence the position of the three-gang relay does not change from that shown in Fig. 4, then the latch 106 will not be permitted to engage the catch 108. However, when the motor operates, then upon energization of the solenoids 100 and consequent opening of the second contact 102, the circuit through the latch solenoid 105 is broken. This results in releasing the latch 106, and the spring 107 brings it into engagement with the catch 108 to hold the plunger 68 in its depressed position, and thereby keep the reagent slide in the position in which the specimen is under the reagent applicator.

The third contact 103 of the three-gang relay is connected in series with the solenoid 76 of the reagent applicator 60, a variable resistance 109, a manually operated snap switch 110 and the battery 99. Upon energization of the relay solenoids 100 and consequent closure of the third contact 103, the reagent applicator 60 is depressed into contact with the specimen, and is held in contact therewith so long as this third contact (and the manually operated switch 110) are kept closed.

The occurrences that ensue within the first few moments after the plunger 68 has been depressed may be summarized as follows: The motor 87 is started, and simultaneously the solenoid 105 is energized, holding the latch 106 in the open position. Almost at once the cam-opened spring switch 96 closes, insuring continued operation of the motor 87. Directly thereafter, the cam-closed switch 97 is closed, energizing the three-gang relay. The first contact of the relay closes to keep the relay energized. The second relay contact opens, releasing the latch 106 to engage with the plunger catch 108 and hold it in the depressed position. The third relay contact closes, energizing the reagent applicator and depressing it into contact with the specimen.

The state of affairs thus established prevail until continued rotation of the cam shaft 88 causes the cam 91 to engage with and open the normally closed spring switch 98. The circuit by which the relay is energized is through this switch, and as soon as it is open by the cam 91, the relay contacts revert to the position shown in Fig. 4, in which the first and third contacts 101 and 103 thereof are open, and the second contact 102 is closed. Opening of the first contact 101 insures that the relay will remain deenergized until the switch 97, operated by the second cam 90, is again closed. Opening of the third contact 103 of the relay results in de-energizing the reagent applicator solenoid 76, so that it is lifted by its spring 74 from the surface of the specimen. Almost immediately after opening of the contact 103, closure of the second relay contact 102 again completes the circuit through the latch solenoid 105, releasing the plunger 68, and the latter is at once raised by the spring 69, causing the slide 14 to return to its original position and again bring the specimen under the microscope objective for observing the results of the reaction with the reagent applied thereto.

Lifting of the plunger 68 breaks the connection to the motor through the contact button 85. However, the motor circuit is still in circuit with the A. C. supply line through the spring switch 96, and so continues to run until the cam shaft 88 has completed one full revolution. When it has done so, the first cam 89 opens the switch 96, thereby disconnecting the motor from the supply line and causing it to stop. Lifting of the plunger 69 also breaks the circuit through the latch solenoid 105, so the latch returns to its closed position, but now, with the plunger raised, the latch has no effect on it, and it would be wasteful of the battery to continue to keep the solenoid 105 energized.

It is evident from the foregoing description that the time during which the reagent applicator is depressed into contact with the specimen depends on the length of time that the solenoids 100 of the three-gang relay are energized; and this, in turn, depends on the time required for the cam shaft to rotate from the position at which the second cam 90 closes the normally opened switch 97 to the position at which the third cam 91 opens the normally closed switch 98. This time interval is made adjustable by mounting the switch 98 so that it may be rotated to any desired angular position about the cam shaft axis. If rotated to a position in which it is opened by the cam 91 at the same instant that the switch 97 is closed by the second cam 90, then the relay solenoids 100 will not be energized, nor will the reagent applicator solenoid be energized, and the time of reagent application will be zero. If the switch 98 is rotated to the position at which it is not open until the cam shaft 88 makes a complete revolution after first closure of the switch 97, then the relay solenoids 100 and the reagent applicator solenoid will be energized for the full length of time required by the cam shaft to make one revolution (say 15 seconds). Any intermediate time interval of reagent application may be preselected by setting the switch 98 at the appropriate angular position between these two extremes.

The fifth cam 92 is provided to permit reagent applications of longer duration than the time required for a single rotation of the cam shaft. The cam 92 is rotated along with the toothed wheel 93, which is actuated by the pin 94 on the hub 95 rotating with the cam shaft 88, and which advances counterclockwise through the angular distance of one tooth each time the cam shaft makes a complete revolution. The teeth on the wheel 93 are evenly spaced except that at one position (shown in Fig. 4 adjacent the pin 94) a single tooth is removed. When the toothed wheel 93 is in the position shown in Fig. 4, so that the pin 94, rotating clockwise, finds no tooth with which to engage, it is unable to effect rotation of the wheel 93 and the cam 92 carried thereby. Also, when the toothed wheel is in this position, the operating lever of a cam-closed spring switch 111 enters a depression 112 in the surface of the cam 92, permitting the switch 111 to open. In all other positions of the cam 92, the operating lever of the switch 111 rides on the periphery of the cam, holding the switch closed. In the closed position, the switch 111 short-circuits the angularly adjustable switch 98 through which the three-gang relay is normally caused to open.

To illustrate operation of the cam 92, let us assume that the cam shaft 88 makes one revolution in fifteen seconds, and it is desired to have the reagent applicator remain in contact with the specimen for thirty-five seconds. In such case, each tooth on the wheel 93 corresponds to fifteen seconds (the time of one rotation of the cam shaft) of reagent application. Then to set the timing mechanism for thirty-five seconds of reagent application, the switch 98 is rotated to the angular position corresponding to five seconds of reagent application time, and the toothed wheel 93 is rotated clockwise from the position shown in Fig. 4 through the angular distance of two teeth (representing a total of thirty seconds of reagent application time). The toothed wheel 93 may be axially slideable on its shaft to permit moving it temporarily out of engagement with the pin 94 so that such presetting of the cam 92 may be effected. Spring means may be provided to return the toothed wheel into position for engagement with the pin after it has been set. When the toothed wheel 93 and cam 92 are rotated from the position shown, the operating lever of the switch 111 rides up on the peripheral surface of the cam and the switch is closed.

With the controls thus set, the cam 91 opens the switch 98 five seconds after the relay circuit has been closed, but because this switch is now short-circuited by the cam-closed switch 111, nothing happens. At the completion of one revolution of the cam shaft, the pin 94 rotates the toothed wheel 93 counterclockwise through the angular distance of one tooth, but the switch 111 still remains closed. Also, at the completion of one revolution of the cam shaft, the switch 96 is momentarily opened by the first cam, but the motor does not stop because it is still connected to the supply line through the plunger contact button 85. Another five seconds later, when the switch 98 is opened for the second time, the relay circuit still remains closed through the switch 111. Upon completion of the second rotation of the cam shaft, the toothed wheel 93 is rotated again through the angular distance corresponding to one tooth. The wheel is now in the position (shown in Fig 4) where the pin 94 will find no tooth with which to engage the next time the cam shaft rotates, and where the operating lever of the switch 111 enters the depression 112, causing the switch to open. At this time, however, the relay circuit is closed through the normally closed switch 98, so that still nothing happens. Five seconds later, however, or thirty-five seconds after the relay circuit was first energized, the switch 98 is opened for the third time by the cam 91. Since now the switch 111 is also open, the relay circuit is de-energized and the reagent applicator is lifted from the surface of the specimen in the manner described above.

With the apparatus shown in the drawings, in which the toothed wheel has eleven teeth, and assuming the cam shaft to rotate once in fifteen seconds, the time of reagent application may be set at any desired value from zero to three minutes. Any other desired timing range may, of course, be provided by changing the speed of rotation of the cam shaft and the number of teeth on the wheel 93.

The apparatus shown in Figs. 1 to 4 may be employed for identifying an unrecognized constituent particle of a specimen being observed under the microscope in the following manner: Let us assume that the specimen is being analyzed by the linear measurement method described above, using the motor driven micrometer feed shown in Figs. 6 and 7, when an unrecognized particle comes into position for observation. The analyst depresses the switch button 53 on the control panel 44, stopping the micrometer motor drive. He has previously charged the reagent holder 71 of the reagent applicator with a suitable reagent, and let us also assume he has previously set the timer mechanism shown in Fig. 4 for a suitable time interval (if he has not previously done so, he can at this time). Next the plunger 68 is depressed, moving the slide and the mineral specimen it carries from the point at which the unrecognized particle was directly under the microscope objective to the position at which the same point is directly under the reagent applicator. Thereby the timer relay circuit described above is also set into operation and the reagent is applied to the particle being observed for the desired length of time. At the completion of this time interval, when the timer relay circuit is de-energized, the latch 106 holding the plunger 68 in the down position is released, the spring 69 lifts the plunger to its original position, and the reduced pressure thereby created in the air compressor 66 and in the air cylinder 61 causes the piston 62 to return the slide 14 to the position in which the unrecognized particle is again directly under the microscope objective and in position for observation, where the results of the chemical reaction produced by the reagent may be studied.

If the reagent holder has been charged beforehand with a suitable reagent for the type of specimen being examined, and if the timer controls have been preset accordingly, the only operations which the analyst need perform involve pressing the stop switch button 53 and then the plunger 68. These may be manipulated without removing the eyes from the microscope eye-piece, so that the analyst may observe the results of the reaction of the reagent on the specimen almost at once after the reagent has been applied. This is frequently of importance, because often much can be learned from the progress of the reaction in the first few seconds after reagent application.

The apparatus has been described with particular reference to a reagent holder designed to apply a chemical to the specimen. The term "reagent holder" as used in this specification and in the appended claims, however, also includes other types of test devices, some of which are shown in Fig. 5. The reagent holder shown in Fig. 5A is of the type described above, comprising a holder or sleeve 71, advantageously of metal, containing a glass tube or liner 71a pointed at its lower end, and with a fine capillary opening 71b extending through its pointed end. A reagent holder having the form shown in Fig. 5A is especially well suited for applying chemical vapors to the specimen. The reagent holder shown in Fig. 5C is generally similar to that shown in Fig. 5A, in that it comprises a sleeve or holder 71', having therein a glass liner tube 71a' pointed at its lower end, and through the pointed end of which a fine capillary opening 71b' extends. In the design shown in Fig. 5C, however, the extreme lower end 113 is carefully ground to a slightly flattened point. Such a reagent applicator may be used for applying liquid reagents to the specimen.

The "reagent holder" shown in Fig. 5B is not intended for applying a chemical to the specimen. It comprises a metal sleeve or holder 114 which mounts like the other holders 71 and 71' in the bushing 72 of the reagent applicator. Suitably mounted in the sleeve is a hard pointed needle 115. This device may be used as a hardness tester. The variable resistance 109, shown in Fig. 4 in the reagent applicator circuit, may be used to control the force with which such a hardness tester is brought in contact with the mineral specimen. A milliammeter may be included in series circuit with the variable resistance 109, in order to indicate the force with which the hardness tester point is brought against the specimen.

Although hardness does not provide for positive identification of any mineral, it is nonetheless a very useful characteristic for classifying minerals into groups. With the apparatus herein described, the hardness of a mineral can be determined on grains as small as 10 microns in diameter. The hardness of the specimen may be ascertained by comparison of the depth of the hole produced therein by the needle 115 of the tester under a given force with holes similarly produced in standard specimens of known hardness. An alternative method of determining hardness on a mineral is to bring the needle point rather lightly into contact with the surface of a polished specimen, and then, as the specimen is moved laterally thereunder, to increase the force gradually until a scratch is made. The force exerted when the scratch first starts to form on the specimen is indicative of the hardness.

It sometimes happens that definite information as to the identity of a mineral cannot be obtained either by the chemical vapor or liquid reagents which the apparatus is designed to employ, and it is necessary to gouge out a piece of the mineral. This may be accomplished with a "reagent holder" of the character shown in Fig. 5B, but in which the needle 115 is sharpened to a chisel point. Then the reagent applicator solenoid 76 may be actuated from a source of low frequency alternating current 116 (Fig. 4) through a manually operated switch 117 and a variable resistance 118. The alternating current causes the reagent applicator to vibrate, thus operating the chisel-pointed needle in the manner of a tiny jackhammer. The variable resistance 118 enables controlling the alternating current supply to the solenoid 76 as required for either hard or soft minerals. Samples of the minerals thus dug out may be transferred to a glass slide for examination by micro-chemical techniques, or by microscopic examination with oils of different refractive indices, or otherwise.

Still another form of "reagent holder" is shown in Fig. 5D. This device comprises a holder or sleeve 119 which fits in the bushing 72 of the reagent applicator, and which supports two fine, closely spaced electrodes 120. The electrodes extend through an insulating body 121 and terminate in wires 122 to which appropriate electric connections can be made. If the material being examined contains particles larger than a millimeter in diameter, it is possible to perform microscopic electrolytic etching or electrodepositions with this device when it is brought in contact with the specimen. Particularly useful information may be thus obtained in examining metallic specimens.

It is sometimes advantageous to use the motor driven micrometer feed (described in conjunction with Fig. 6) in lieu of the timer (described in conjunction with Fig. 4) to control the timing of the application of a reagent by the reagent applicator (Figs. 1 and 2) to a mineral or other specimen. This procedure may be followed whenever a stripe rather than a spot, of reagent is desirable, or when it is desired to explore the specimen for small particles of a particular material or compound. In the latter case, for example, instead of using the timer in conjunction with the reagent applicator to test every particle of the specimen, the applicator may be held depressed against the specimen while the micrometer feed is actuated to cause the specimen to travel at a predetermined constant speed under the reagent holder. The speed of travel is, in such case, correlated with the size of the opening 71b in the reagent holder so that each part of the specimen passing thereunder is exposed to the reagent issuing from the opening for the proper period of time. In such a case the motor driven micrometer feed effectively serves as a timer for reagent application. The result on the specimen is a stripe of reagent-treated mineral (or other material) that may be examined for the sought-for constituent.

Another circumstance in which it is desirable to use the motor driven micrometer in lieu of the electrical timer in applying a reagent is when a linear measurement analysis is to be made on a specimen in which two or more components are not naturally readily distinguishable in appearance, and one could be confused with the other during the linear count. Generally in such case one mineral can be stained to present a different appearance than the other by application of a suitable reagent. If the staining reagent is applied along a stripe on the specimen, using the motor driven micrometer feed as a timer in the manner just described, then subsequently a linear measurement analysis can be made readily along the reagent-treated stripe.

An example of an analysis involving this technique, and which required full use of the motor driven micrometer feed in combination with the reagent applicator, was the following: A complex copper-lead flotation concentrate had been prepared from a lead-zinc ore containing both copper and bismuth. Attempts to separate the copper from the lead in the concentrate were unsuccessful owing to the large amount of bismuth also found to have collected therein. A briquette of the concentrate had to be examined to determine the bismuth minerals and to find out with what they were associated, and if they were free, so that the bismuth could be separated from the other minerals by flotation.

The copper in the concentrate occurred chiefly as chalcopyrite which was easy to recognize. Some of the copper occurred as a copper-lead-bismuth sulphide. The lead was mostly as galena but some was combined with bismuth as a sulphide. There was some bismuth sulphide present. These four minerals were all white, and in small grains could not be individually recognized. It was found that iodine would stain the copper mineral, that a mixture of iodine and chlorine would stain the lead-bismuth mineral, and that bromine would stain the bismuth sulphide. The galena was untouched by any reagent. Having ascertained the contact time that gave the best color contrast, the driving speed of the micrometer feed was set so the vapors coming out of the small hole in the reagent holder would leave a trail of the reagent on the mineral strong enough to stain it to this color contrast as the briquette passed thereunder, and the motor drive was started. The first reagent used was iodine which colored the copper-lead-bismuth mineral. The briquette was brought back under the objective and the amount of stained mineral was determined by the linear measurement method. The iodine-chlorine tube was next used over the same path, and the lead-bismuth mineral determined. Finally the bromine was used in the same manner, staining the bismuthinite and leaving the galena still white. These two minerals were determined at the same time. The reagent holder used had a large enough opening to make a stained ribbon wide enough so that a number of linear measurement analyses could be made across the specimen with but one application of each reagent.

It is evident from the foregoing that the apparatus provided by the present invention may be used to perform a wide variety of useful analytical operations on a miscroscopic scale.

I claim:

1. In apparatus for the microscopic analysis of minerals, including a microscope, and a slide movable in a straight line path across the field of view of the microscope and adapted to hold a mineral specimen to be analyzed, the combination of means for measuring linear travel of the slide comprising means for moving said slide along said straight line path and a plurality of cooperating counters and means for operatively connecting the counters to said slide moving means to record the linear travel of the slide corresponding to the sum of the lengths along a line parallel to movement of the slide of the particles of a given recognized constituent of the specimen, with means for momentarily interrupting movement of the slide along said straight line path, a reagent applicator mounted with respect to the microscope within the range of movement of the slide for applying a reagent to any unrecognized particle of the specimen when said movement of the slide is interrupted, thereby to enable identification of such unrecognized particles and to enable them to be included in the counter record, and means for moving the slide backward and forward in a direction at an angle to said straight line path from beneath the microscope objective to beneath the applicator.

2. In apparatus for the microscopic analysis of minerals comprising a microscope having a stage, a slide holder mounted on said stage, a slide mounted in the slide holder and adapted to hold a mineral specimen to be analyzed under the microscope objective, and a micrometer feed for moving the slide holder and slide with specimen thereon across the microscope field of view, the improvement comprising a plurality of counters, means for operatively connecting the counters to the micrometer feed to record the linear travel of the slide corresponding to the sum of the lengths of the particles of each recognized constituent of the specimen measured along a line parallel to the line of movement of the slide, in combination with means for identifying any unrecognized constituent of the specimen comprising a reagent applicator mounted with respect to the microscope within the range of movement of the slide, means for moving the slide backward and forward at right angles to the line of motion of the slide holder from beneath the microscope objective to beneath the applicator, means for delivering a reagent from said applicator to the unknown constituent of the specimen, and a timer control for actuating said delivery means and for actuating return of the slide to bring the specimen back under the microscope objective at a predetermined time interval after delivery of said reagent.

3. Apparatus for the microscopic analysis of minerals comprising a microscope having a stage, a slide holder comprising a recessed frame mounted on said stage, a slide mounted for lateral movement in the recess of the holder and adapted to hold a mineral specimen to be analyzed, a motor driven micrometer feed for moving the slide holder with slide and specimen thereon across the microscope field of view, a plurality of counters, means for operatively connecting said counters to said motor driven micrometer feed to record the linear distance of travel of the specimen corresponding to each recognized constituent particle thereof, means for identifying any unknown constituent of the specimen as it comes into position for observation comprising a reagent applicator mounted at a fixed distance from and with respect to the microscope objective within the range of movement of the slide, means for moving the slide backward and forward through said fixed distance at right angles to the line of motion of the slide holder including an air cylinder mounted on the slide holder, a piston within the cylinder connected to the slide, and means for admitting compressed air to said cylinder, whereby upon actuation of said air admitting means an unknown particle of the specimen may be moved from directly beneath the microscope objective to directly beneath the applicator, and timer means for actuating delivery of a reagent from the applicator to the unknown constituent of the specimen and for actuating return of the slide to bring the specimen back under the microscope objective at a predetermined time interval after delivery of said reagent.

4. In apparatus of the character described for analyzing a specimen under a microscope, a slide adapted to carry the specimen, a reagent applicator, means including a plunger which when depressed actuates the slide to move the specimen from under the microscope objective to under the reagent applicator, electrical means for operating the reagent applicator, a timer including an electrical control circuit controlling the length of time for which the reagent is applied to the specimen and for controlling movement of the slide to bring the specimen from under the reagent applicator back under the microscope objective, and contacts which are closed when said plunger is depressed and which when closed set said electrical control in operation.

5. Apparatus for the microscopic analysis of minerals comprising a microscope, a microscope stage, a slide holder movable across the stage, a slide mounted on said holder and movable thereon between fixed limits in a path at right angles to the line of movement of said holder, said slide being adapted to carry a mineral specimen to be analyzed, a reagent applicator so positioned that when the slide is moved from one limit of its path of travel to the other a point on the specimen is transferred from directly beneath the microscope objective to directly beneath the applicator, said reagent applicator comprising a hollow reagent holder substantially pointed at its lower end and having a fine opening extending from the interior thereof through said pointed end, spring means normally holding the reagent holder above the surface of the specimen, a solenoid which when energized depresses the reagent holder into contact with the surface of the specimen, thereby to apply a reagent to a point on the surface thereof, and a control including a timer actuated upon movement of the slide from the microscope objective to the applicator to energize the solenoid and then after a predetermined time interval to return the slide to its original position with respect to the microscope objective.

6. Apparatus for the microscopic analysis of minerals comprising a microscope, a microscope stage, a movable slide mounted on said stage and adapted to carry a mineral specimen to be analyzed, a reagent-gas applicator comprising a hollow reagent-gas holder substantially pointed at its lower end and having a fine opening through said pointed end mounted at a fixed substantial distance from and with respect to the microscope objective and within the range of movement of the slide, the fine opening in said applicator being substantially unobstructed and of sufficient size to permit a slight continuous outflow of gaseous reagent, and means for moving said slide from beneath the objective to beneath the applicator and from beneath the applicator back to beneath the objective, the movement of the slide being limited to said fixed distance so that the point on the specimen brought directly beneath the pointed end of the applicator is the same point that was directly beneath the microscope objective, means for depressing the pointed end of the reagent holder into contact with the surface of the specimen at said point when it is desired to apply the gaseous reagent thereto, and means for actuating return of the slide to bring said point again directly beneath the objective for observation.

7. Apparatus for the microscopic analysis of minerals comprising a microscope, a microscope stage, a slide mounted on said stage and adapted to carry a mineral specimen beneath the microscope objective for analysis, a reagent applicator mounted at a fixed substantial distance from the microscope objective to apply reagent to a particular limited portion of the specimen, means for moving the slide from beneath the objective to beneath the reagent applicator, means for limiting the movement of the slide to said fixed distance so that the particular limited portion of the specimen brought directly beneath the applicator is the same particular limited portion thereof that was directly beneath the microscope objective, and means for actuating delivery of a reagent to said particular limited portion of the specimen and for actuating return of the slide to bring said particular limited portion of the specimen again directly beneath the objective for observation.

8. Apparatus according to claim 7 in which the means for moving the slide from beneath the objective to beneath the reagent applicator comprises an air cylinder mounted on the microscope stage, an air compressor connected thereto, and a piston within the cylinder connected to the slide to move the slide on said microscope stage.

9. Apparatus for the microscopic analysis of minerals comprising a microscope, a microscope stage, a slide mounted on said stage and adapted to carry a mineral specimen beneath the microscope objective for analysis, a reagent applicator mounted at a fixed substantial distance from the microscope objective to apply reagent to a particular limited portion of the specimen, means for moving the slide from beneath the objective to beneath the reagent applicator, means for limiting the movement of the slide to said fixed distance so that the particular limited portion of the specimen brought directly beneath the applicator is the same particular limited portion thereof that was directly beneath the microscope objective, means for actuating delivery of a reagent to said particular limited portion of the specimen, and timing means operatively connected to said slide moving means for returning the slide to bring said particular limited portion of the specimen again directly beneath the objective for observation at a predetermined time interval after delivery of the reagent thereto.

10. Apparatus for the microscopic analysis of minerals comprising a microscope having a stage, a slide mounted on the stage, a micrometer feed connected to the slide for moving a mineral specimen mounted on the slide across a point of observation in the field of view of the microscope, a plurality of counters, means for operatively connecting each counter selectively to the micrometer feed to record the sum of the length of the particles of each recognized constituent of the specimen as measured along the line of motion of the specimen through said point of observation, a variable speed motor drive for the micrometer feed and counters, means for operating said motor drive at a slow speed when relatively small particles of the specimen are being moved across the point of observation in the microscope field of view and means for operating said motor drive at a relatively fast speed when relatively large particles are being moved across said point of observation.

11. Apparatus for the microscopic analysis of minerals comprising a microscope having a stage, a slide holder having a recess therein mounted on the stage, a slide mounted in the recess of the holder and adapted to carry a specimen to be analysed, a reagent applicator mounted at a fixed substantial distance from the microscope objective, said reagent applicator having means for applying a reagent to a limited portion of the specimen, means for moving the slide back and forth through said fixed distance, and a variable speed motor drive connected to the slide holder for moving the slide holder, slide and specimen relative to the reagent applicator in a direction at an angle to the direction of movement of the slide back and forth from the objective to the reagent applicator, whereby the specimen may be moved relative to the reagent applicator at a chosen speed such that optimum time of contact between a specimen on the slide and a reagent issuing from the reagent applicator is attained.

BENTLEY H. McLEOD.

References Cited in the file of this patent

UNITED STATES PATENTS

| Number | Name | Date |
|---|---|---|
| 808,112 | Pierpont | Dec. 26, 1905 |
| 1,786,626 | Lohman | Dec. 30, 1930 |
| 1,877,981 | Schafer | Sept. 20, 1932 |
| 1,891,052 | Ott | Dec. 13, 1932 |
| 1,891,348 | Ellinger et al. | Dec. 20, 1932 |
| 1,987,733 | De Fonbrune | Jan. 15, 1935 |
| 2,123,354 | Corse | July 12, 1938 |
| 2,229,451 | Gulliksen | Jan. 21, 1941 |
| 2,252,542 | Beeh | Aug. 12, 1941 |
| 2,270,177 | Vawryk | Jan. 13, 1942 |
| 2,301,935 | Ehringhaus | Nov. 17, 1942 |
| 2,313,846 | Tamminga | Mar. 16, 1943 |
| 2,328,762 | Webster | Sept. 7, 1943 |
| 2,407,304 | Thompson et al. | Sept. 10, 1946 |
| 2,418,036 | Lane | Mar. 25, 1947 |
| 2,485,444 | Hofberg | Oct. 18, 1949 |